G. E. BATCHELLER.
PNEUMATIC TIRE MOLD.
APPLICATION FILED NOV. 26, 1912.
1,113,925.
Patented Oct. 13, 1914.
2 SHEETS—SHEET 2.
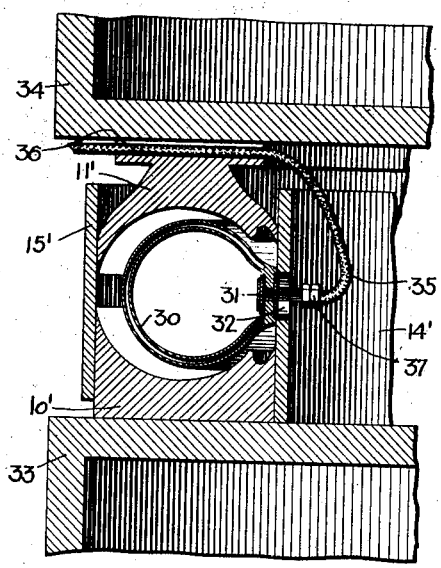
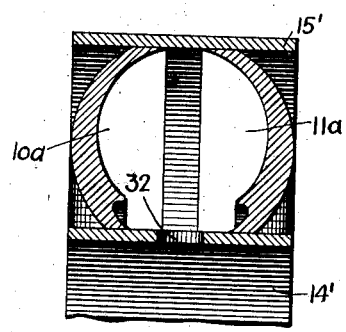
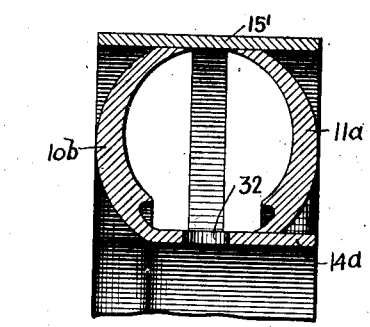
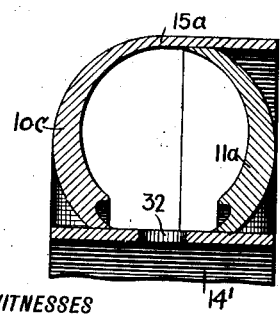
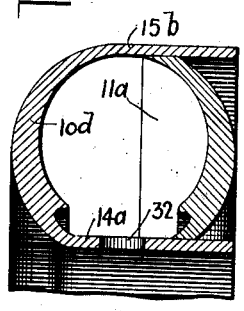
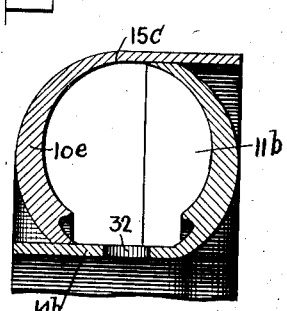
WITNESSES
C. J. Hachenberg
Geo. L. Beele
INVENTOR
GEORGE E. BATCHELLER
BY Munn & Co
ATTORNEYS

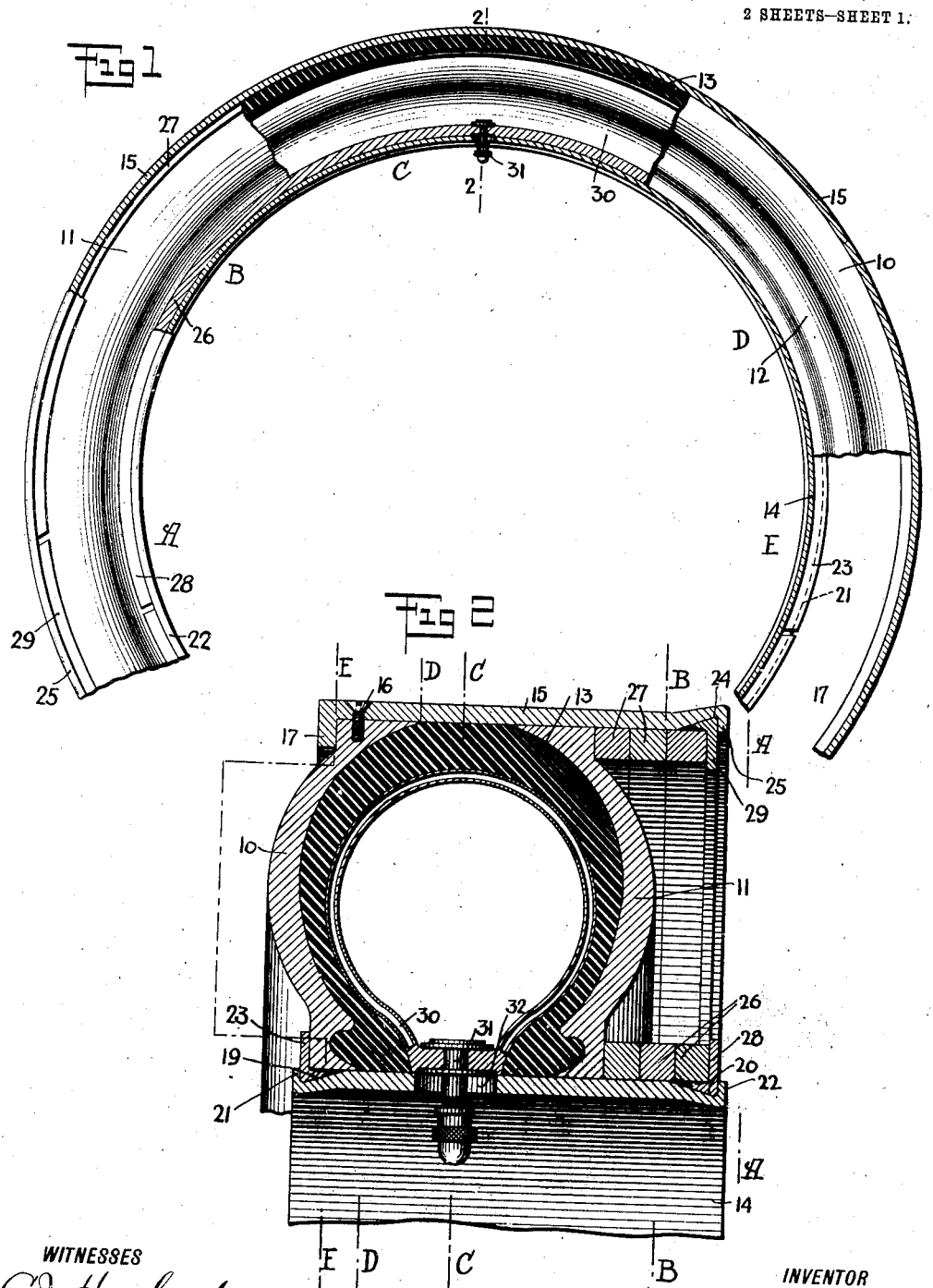

UNITED STATES PATENT OFFICE.

GEORGE E. BATCHELLER, OF MOUNT VERNON, NEW YORK.

PNEUMATIC-TIRE MOLD.

1,113,925. Specification of Letters Patent. Patented Oct. 13, 1914.

Application filed November 26, 1912. Serial No. 733,595.

*To all whom it may concern:*

Be it known that I, GEORGE E. BATCHELLER, a citizen of the United States, and a resident of Mount Vernon, in the county of Westchester and State of New York, have invented a new and Improved Pneumatic-Tire Mold, of which the following is a full, clear, and exact description.

This invention relates to pneumatic tire apparatus, and has particular reference to a means for vulcanizing or repairing and revulcanizing the shoes of pneumatic tires for vehicles and the like.

Among the objects of the invention is to provide a means of a nature suitable for the repair, in a substantial and satisfactory manner, of various makes of standard tires.

More particularly stated, the object of the invention is to enable a repairer to treat various makes of tires which, while purporting to be of the same size, may vary to a considerable extent in actual dimensions measured from bead to bead around the circumference of the cross section, and because of which fact the means now in general use are inadequate or unsuited for operation upon different makes of tires.

The foregoing and other objects of the invention will hereinafter be more fully described and claimed and illustrated in the drawings accompanying this specification in which like characters of reference indicate corresponding parts in all the views, and in which—

Figure 1 is a side elevation of a portion of the device applied to a pneumatic tire, portions being in section or in elevation, the several planes thereof being indicated by corresponding section lines in Fig. 2; Fig. 2 is a transverse section of the same on a plane corresponding to the line 2—2 of Fig. 1; Fig. 3 is a transverse section of a slightly modified form of apparatus; and Figs. 4 to 8 inclusive are diagrams illustrating various modifications of elements hereinafter more fully described.

Referring more particularly to the drawings it will be understood that in each of the several modifications there are shown a pair of oppositely arranged rings or annular plates which conform to the side faces of the tire and are adjustable toward and from each other for the accommodation of tires of varying sizes and which are adapted to be secured in adjusted position with relation to each other and the tire by suitable means. As shown in Figs. 1 and 2, said annular plates are indicated by the reference characters 10 and 11, each having a concave annular face 12 directed toward the other plate and adapted to conform to the outside of the tire 13 being operated upon. These plates also are preferably provided with inner and outer rims having smooth cylindrical faces. As before premised, these plates 10 and 11 are adapted to be adjusted toward and from each other and maintained in proper radial alinement. In these figures I illustrate a pair of substantially cylindrical inner and outer radially spaced rings 14 and 15 with which said cylindrical faces of the inner and outer rims or margins of the plates 10 and 11 are adapted to closely fit respectively. As shown in Fig. 2, the plate 10 may be connected permanently to the ring 15 as by means of removable fasteners 16, the outer rim of the plate 10 not only fitting radially against the ring 15, but bearing laterally in a direction parallel to the axis of the tire against an inwardly projecting flange 17 carried by the ring 15. The inner ring 14 is provided with grooves 19 and 20 adjacent and parallel to the edges thereof which form outwardly projecting flanges 21 and 22, the peripheries of which, however, preferably do not extend beyond the main cylindrical surface of said ring. A split spring ring 23 is adapted to be set into the groove 19 and limit the outward movement of the plate 10, the inner rim of which is fitted to the cylindrical surface of the ring 14 and bears laterally against the inner surface of said split ring 23. The ring 15 at the edge opposite the flange 17 is provided with a groove 24 which forms an inwardly projecting flange 25 which likewise should not extend beyond the main cylindrical surface of the ring 15. At 26 and 27 are shown sets of rings of any suitable character or thickness which are adapted to coöperate respectively with the cylindrical surfaces of the rings 14 and 15 and bear against the outer faces of the inner and outer rims of the plate 11. When the proper adjustment of the plate 11 toward the plate 10 is effected, the rings 26 and 27 will be slipped in place, as many of them as will be needed for the particular job, and said rings 26 and 27 will then be locked from displacement outwardly over the flanges 22 and 25 by means of split rings 28 and 29 respectively, which fit into the aforesaid grooves 20 and 24.

An inflatable air bag 30 of annular form is placed within the tire 13 and after the tire is cleansed and prepared for the operation of re-vulcanizing, the tire with the inclosed air bag will be put in place with respect to the plate 10 and the ring 15. The ring 15 may be put in place with respect to the plate 10 either before or after the introduction of the tire, as just stated. The air nozzle 31 of the air bag may project inwardly through a slot 32 extending through the ring 14 so that the pressure fluid for the air bag may be controlled at any position of adjustment of the tire within the mold. The plate 11 will then be slipped between the rings 14 and 15 and there secured by the means already described. In carrying out the operation, the air bag will then be charged with air or other suitable fluid under a pressure of one hundred to one hundred and fifty pounds per square inch, and the mold with the tire thus prepared will be subjected to any suitable or approved vulcanizing process. At the end of such process, the air bag 30 will be deflated and the parts separated by an operation reverse to that described above in connection with the assembling or preparation for the vulcanizing process. The several locking rings and coöperating flanges just described make it feasible and practical to remove the plate 11 and ring 14 separately in succession and either of them may be removed first as may be found most suitable. The tire remaining within the ring 15 and against the plate 10 may then readily be removed in its finished and perfect condition.

The apparatus shown in Fig. 3 corresponds to that previously described with respect to the relatively adjustable plates 10' and 11' and also the inner and outer rings 14' and 15'. In this form of the invention, however, the plate 10' rests upon the preferably horizontal base 33 of a suitable form of hot press. The companion plate 11' also has a preferably flat outer surface upon which is placed the platen 34 of the hot press. The base 33 and platen 34 are understood to be of considerable weight and strength and are adapted to be charged with steam under suitable pressure and temperature. The air bag 30, as before, will be charged with suitable pressure fluid which will coöperate with the pressure resulting from the application of the platen 34, such fluid pressure being introduced into the air bag through a suitable tube 35 which may be directed to the outside of the apparatus through a groove 36 extending radially across one of the plates such, for instance, as the plate 11'. Said tube 36 is preferably detachably connected by means of a union 37 to the nozzle 31 extending through the ring groove 32.

The purpose of the diagrams of Figs. 4 to 8 inclusive is to exhibit a few of the many variations in form of the side plates and their relation to the inner and outer rings. It is to be understood also that any suitable adjusting and locking mechanism may be employed with any of these several modified constructions. In Fig. 4 the inner and outer rings 14' and 15' may be similar to those shown in Fig. 3, having smooth opposing cylindrical surfaces along which the side plates 10$^a$ and 11$^a$ are adapted to be adjusted toward and from each other. In Fig. 5 the side plate 10$^b$ is shown connected integrally with the inner ring 14$^a$, and the other side plate 11$^a$ and the outer ring 15' may be the same as in Fig. 4. In Fig. 6 the side plate 10$^c$ is integral with the outer ring 15$^a$, and the side plate 11$^a$ and inner ring 14' may be similar to those shown in Fig. 4. Fig. 7 shows the side plate 10$^d$ integral with both the inner and outer rings 14$^a$ and 15$^b$, and the side plate 11$^a$ is separate. Again, in Fig. 8 is shown a form in which each side plate is formed integrally with a ring, the side plate 10$^e$ being connected to the outer ring 15$^c$ and the other side plate 11$^b$ being connected to the inner ring 14$^b$.

As already intimated, the details of construction may be varied to a considerable extent as to the form thereof and the materials from which they may be made. I desire, therefore, not to be limited as to such details except as may be required by the state of the art.

Having thus described my invention, I claim as new and desire to secure by Letters Patent:—

1. The herein described pneumatic tire apparatus comprising, in combination, a pair of side plates having oppositely disposed annular concave surfaces adapted to conform to the sides of tires of different types or sizes, said plates having inner and outer rims with smooth cylindrical faces, means to adjust said side plates toward and from each other according to varying sizes of tires, devices to lock the side plates in different positions relatively to each other, means coöperating with said plates to maintain them in proper radial alinement notwithstanding the aforesaid adjustments, said means comprising inner and outer cylindrical rings fitted to said plate rim faces, a bag for a pressure fluid within and spaced from the side plates, and means to introduce a pressure fluid into the bag aforesaid through one of said cylindrical rings irrespective of the aforesaid relative adjustment of the side plates toward and from each other.

2. In a pneumatic tire apparatus, the combination of a pair of side plates having opposed surfaces adapted to conform to the sides of a tire and adjustable toward and from each other, a pair of radially spaced rings coöperating in close contact with said plates to maintain them in proper radial alinement, one of said rings being rigidly secured to one of said side plates, and means extending through one of said rings to introduce and control a pressure fluid within the space between said plates.

3. The herein described pneumatic tire apparatus comprising a pair of side plates having opposed surfaces adapted to conform to the sides of a tire to be treated and movable toward and from each other, radially spaced rings coöperating directly with the inner and outer rims of both of said plates to maintain them in perfect radial alinement, said rings having opposed cylindrical surfaces and circular grooves forming edge flanges, locking devices including split rings seated in said grooves and serving in connection with said flanges to prevent lateral displacement of said plates, and means to introduce a pressure fluid into the space between said plates and through one of said alining rings.

In testimony whereof I have signed my name to this specification in the presence of two subscribing witnesses.

GEORGE E. BATCHELLER.

Witnesses:
 GEO. L. BEELER,
 PHILIP D. ROLLHAUS.